United States Patent
Miceli et al.

(10) Patent No.: US 7,587,939 B2
(45) Date of Patent: Sep. 15, 2009

(54) SYSTEM AND PROCESS FOR MONITORING VEHICLE FUEL LEVEL

(75) Inventors: Michael V. Miceli, Fenton, MI (US); Donald R. Begin, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 88 days.

(21) Appl. No.: 11/848,975

(22) Filed: Aug. 31, 2007

(65) Prior Publication Data

US 2009/0056436 A1    Mar. 5, 2009

(51) Int. Cl.
*G01F 23/00* (2006.01)
(52) U.S. Cl. .................................. 73/290 R
(58) Field of Classification Search ............... 73/290 R
See application file for complete search history.

(56) References Cited

U.S. PATENT DOCUMENTS

| | | | |
|---|---|---|---|
| 6,324,457 B1 * | 11/2001 | Minowa et al. | 701/70 |
| 6,351,701 B2 * | 2/2002 | Minowa et al. | 701/70 |
| 6,415,216 B2 * | 7/2002 | Minowa et al. | 701/70 |
| 6,463,377 B2 * | 10/2002 | Minowa et al. | 701/70 |
| 6,564,137 B2 * | 5/2003 | Minowa et al. | 701/70 |
| 6,980,899 B2 * | 12/2005 | Minowa et al. | 701/70 |
| 7,135,981 B1 * | 11/2006 | Lafontaine | 340/618 |
| 7,209,821 B2 * | 4/2007 | Minowa et al. | 701/70 |
| 2003/0149521 A1 * | 8/2003 | Minowa et al. | 701/70 |
| 2005/0115314 A1 * | 6/2005 | Meagher | 73/290 B |
| 2005/0143890 A1 * | 6/2005 | Minowa et al. | 701/70 |

* cited by examiner

Primary Examiner—Hezron Williams
Assistant Examiner—Rodney T Frank
(74) Attorney, Agent, or Firm—Ingrassia, Fisher & Lorenz, P.C.

(57) ABSTRACT

A process is provided for monitoring the amount of fuel remaining in a vehicle's storage tank, the vehicle including a fuel level sensor. The process includes the steps of searching for a refueling event, establishing a base line fuel level utilizing the fuel level sensor when a refueling event is detected, tracking fuel consumption, and calculating the amount of fuel remaining in the storage tank as a function of fuel consumption and the base line fuel level.

17 Claims, 2 Drawing Sheets

SYSTEM AND PROCESS FOR MONITORING VEHICLE FUEL LEVEL

TECHNICAL FIELD

The present invention generally relates to vehicular fuel systems and, more particularly, to a system and process for monitoring the amount of fuel (e.g., gasoline) remaining in a vehicle's fuel storage tank.

BACKGROUND

Most vehicles (e.g., automobiles) produced today employ internal combustion engines, which consume liquid fuel (e.g., gasoline) during operation. Generally, a vehicle is equipped with a fuel monitoring system, which monitors the amount of liquid fuel remaining within a fuel storage tank. Such a fuel monitoring system may include a processor, a float-based fuel level sensor, and a fuel gauge, which may be mounted near the vehicle's instrument control panel. The float-based sensor measures the relative height of the fuel's upper surface (the "fuel level") and conveys this measurement to the processor, which updates the fuel gauge accordingly.

While conventional fuel monitoring systems of the type described above generally provide an accurate indication of the amount of fuel remaining in the vehicle's storage tank, this may not always be the case. For example, if the vehicle comes to an abrupt stop (or performs a similar maneuver), the stored fuel may splash about within storage tank for a brief period of time (referred to herein as "fuel slosh") during which the float-based sensor may produce inaccurate readings. In addition, when the vehicle is located on a gradient, the fuel storage tank becomes tilted and the fuel stored therein flows to a low point in the fuel storage tank (referred to herein as "fuel displacement"). This again may cause the float-based sensor to produce inaccurate readings. While certain algorithms have been developed that may reduce system inaccuracies due to fuel slosh, such algorithms are generally unable to compensate for accuracies introduced by fuel displacement, which may last for a considerably longer period of time (e.g., as when the vehicle is parked on a hillside).

Considering the above, it should be appreciated that it is desirable to provide a system and a method for accurately monitoring the volume of fuel (or fuel level) remaining within a vehicle's storage tank. It would further be desirable if such a system and method were capable of significantly decreasing errors caused by fuel slosh and fuel displacement. Other desirable features and characteristics of the present invention will become apparent from the subsequent detailed description and the appended claims, taken in conjunction with the accompanying drawings and the foregoing technical field and background.

SUMMARY

A process is provided for monitoring the amount of fuel remaining in the storage tank of a vehicle that includes a fuel level sensor. The process includes the steps of searching for a refueling event, establishing a base line fuel level utilizing the fuel level sensor when a refueling event is detected, tracking fuel consumption, and calculating the amount of fuel remaining in the storage tank as a function of fuel consumption and the base line fuel level.

A fuel monitoring system is also provided for use in conjunction with a vehicle of type which includes a storage tank. The fuel monitoring system includes a fuel level sensor configured to measure the fuel level of the fuel held within the storage tank and a processor coupled to the fuel level sensor. The processor is configured to search for a refueling event, establish a base line fuel level utilizing the fuel level sensor when a refueling event is detected, track fuel consumption, and calculate the amount of fuel remaining within the storage tank as a function of fuel consumption and the base line fuel level.

DESCRIPTION OF THE DRAWINGS

The present invention will hereinafter be described in conjunction with the following drawing figures, wherein like numerals denote like elements, and.

DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
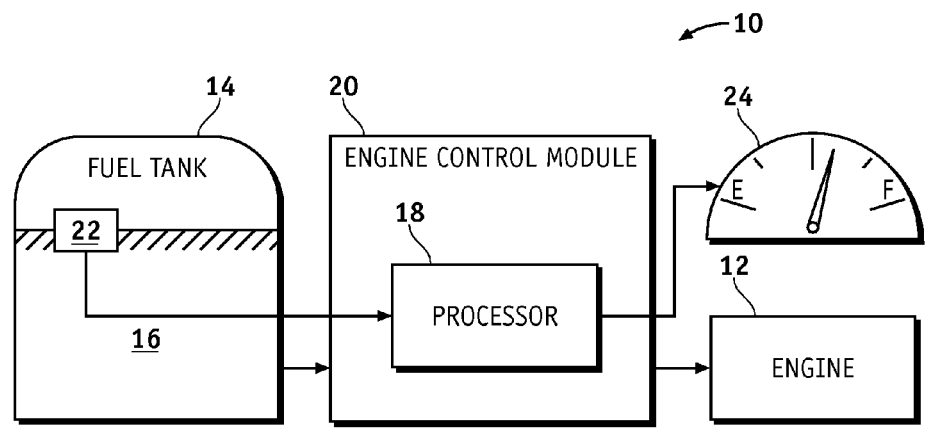
FIG. 1 is block diagram of a fuel monitoring system in accordance with a first exemplary embodiment.

FIG. 1 is block diagram of a fuel monitoring system 10 in accordance with a first exemplary embodiment. Fuel monitoring system 10 is suitable for deployment on a vehicle having an engine that consumes a liquid fuel, such as gasoline. Such a vehicle may be a watercraft or an aircraft of any suitable type; however, for purposes of illustration, fuel monitoring system 10 will be described herein as being deployed on a motor vehicle of the type which includes an internal combustion engine 12.

Exemplary fuel monitoring system 10 includes a fuel storage tank 14, which stores a liquid fuel 16. Fuel monitoring system 10 also includes a processor 18, which may be associated with the vehicle's engine control module 20. An input of processor 18 is coupled to a fuel level sensor 22, and an output of processor 18 is coupled to a fuel level display 24. As indicated in FIG. 1, fuel level sensor 22 may be a conventional float-based sensor; however, it should be appreciated that fuel level sensor 22 may comprise any device suitable for measuring a characteristic indicative of the volume of stored fuel, including, but not limited to, radiofrequency and sonar-type devices. Similarly, it should be appreciated that fuel display 24 may comprise any display device suitable for indicating the volume of fuel remaining within storage tank 14. For example, fuel display 24 may be a conventional gauge as shown in FIG. 1. Alternatively, fuel display 24 may take the form of a digital readout produced on, for example, a display (e.g., a liquid crystal display) mounted proximate the vehicle's instrument control panel or center stack. In certain embodiments, such a display may be associated with a user interface system (e.g., a driver information center) utilized to adjust various vehicular features.

During operation, internal combustion engine 12 consumes fuel 16 held in fuel storage tank 14. The rate at which engine 12 consumes fuel 16 may be generally controlled (or monitored) by engine control module 20. In particular, engine control module 20 may control the operation of a series of fuel injectors (not shown), which periodically spray atomized fuel into the combustion chambers of internal combustion engine 12 in the well-known manner. By monitoring fuel injector on-time, engine control module 20 may determine the volume of fuel 16 consumed by engine 12 for a given period of time utilizing known conversion means (e.g., a two dimensional look-up table).

Processor 18 continually updates fuel display 24 to reflect the current volume of fuel 16 remaining in storage tank 14. In conventional fuel monitoring processes, processor 18 utilizes fuel level sensor 22 to continually measure the surface level height of fuel 16, which is a relative indication of the remaining fuel volume, and updates fuel display 24 accordingly. However, as explained above, fuel level sensor 22 may fail to provide an accurate measurement of the amount of fuel 16 remaining within storage tank 14 due to fuel slosh and/or fuel displacement. To effectively eliminate such inaccuracies, processor 18 may be configured to perform a fuel monitoring process wherein processor 18 calculates the volume of fuel remaining within storage tank 14 as a function of a previously-established base line fuel level and the volume of fuel consumed since last establishing the base line fuel level. An example of such a fuel monitoring process will now be described in conjunction with FIGS. 2 and 3.

Figure 2:
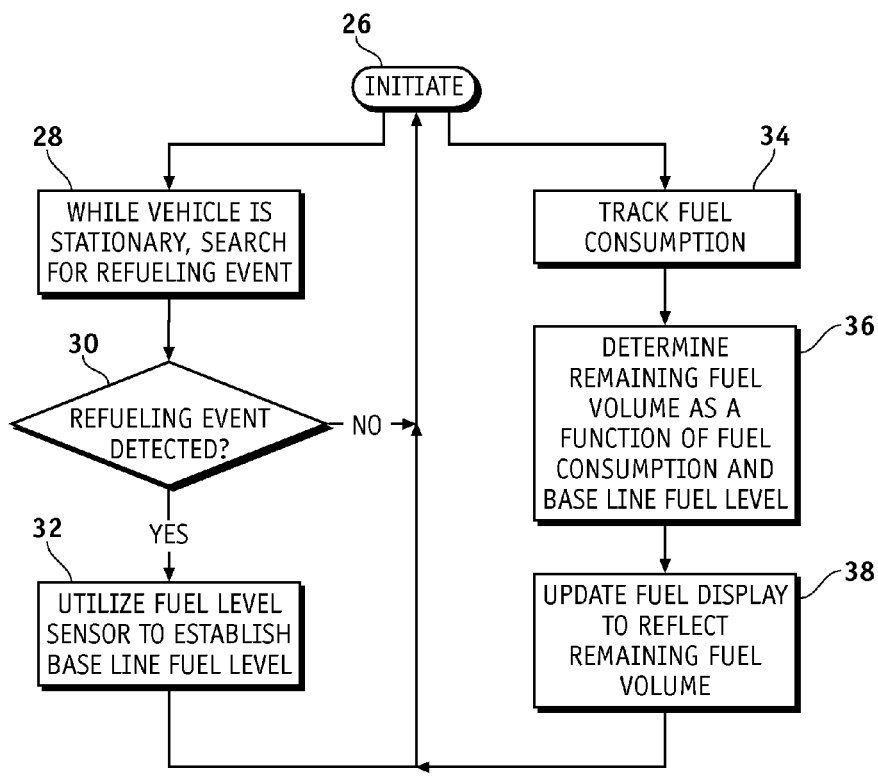
FIG. 2 is a flowchart illustrating an exemplary fuel monitoring process that may be performed by the fuel monitoring system shown in FIG. 1 in accordance with a second exemplary embodiment.

FIG. 2 is a flowchart illustrating an exemplary fuel monitoring process that may be carried out by processor 18 to accurately determine the volume of fuel remaining within fuel storage tank 14. In this example, the fuel monitoring process comprises two branches, which may be performed concurrently after the process commences (INITIATE 26). The first branch of the process consists of STEPS 28, 30, and 32; and the second branch consists of STEPS 34, 36, and 38. As indicated in FIG. 2 at STEP 28, the first branch (STEPS 28, 30, and 32) is preferably only performed while the vehicle is substantially stationary, which may be determined by monitoring vehicle speed or other such operational parameter. Specifically, processor 18 may perform the first branch of the process (STEPS 28, 30, and 32) only if the vehicle's speed is below a minimum speed threshold (e.g., 3 kilometers per hour). By comparison, the second branch (STEPS 34, 36, and 38) may be performed whether the vehicle is stationary or moving.

During the initial step of the first branch (STEP 28), processor 18 searches for a refueling event. In one embodiment, processor 18 utilizes fuel level sensor 22 to continually monitor the volume of fuel present within tank 14. If the volume of fuel does not increase while the vehicle is substantially stationary, processor 18 returns to INITIATE 26 and the process repeats. However, if the volume of fuel within tank 14 increases while the vehicle is substantially stationary, processor 18 concludes that a refueling event has occurred (STEP 30) and advances to STEP 32. During STEP 32, processor 18 establishes a new base line fuel level as the fuel level currently indicated by fuel level sensor 22.

During the initial step of the second branch (STEP 34) of the process shown in FIG. 2, processor 18 tracks the volume of fuel consumed by engine 12 over period of time (e.g., since last establishing a new base line fuel level during STEP 32). Processor 18 may track fuel consumption utilizing any suitable device or technique, including by calculating fuel volume as a function of the total time the fuel injectors have been on since establishing the base line fuel level.

Next, at STEP 36, processor 18 calculates the current volume of fuel 16 remaining in storage tank 14 as a function of vehicle fuel consumption and the most recently established base line fuel level. For example, processor 18 may determine the current volume of remaining fuel by recalling the base line fuel level from a memory, converting the base line fuel level into a base line fuel volume, and then subtracting the volume of consumed fuel from the base line fuel volume.

After determining the current volume of fuel 16 remaining within fuel storage tank 14, processor 18 updates fuel display 24 to reflect the volume of remaining fuel (STEP 38). If desired, processor 18 may also update any other fuel-related parameter that is tracked or displayed by fuel monitoring system 10 (e.g., average miles per gallon, vehicle range in view of remaining fuel, etc.). After this has been done, processor 18 returns to INITIATE 26 and the process repeats. By continually performing the process shown in FIG. 2, fuel monitoring system 10 may monitor the volume of fuel 16 remaining within storage tank 14 with a relatively high degree of accuracy.

Figure 3:
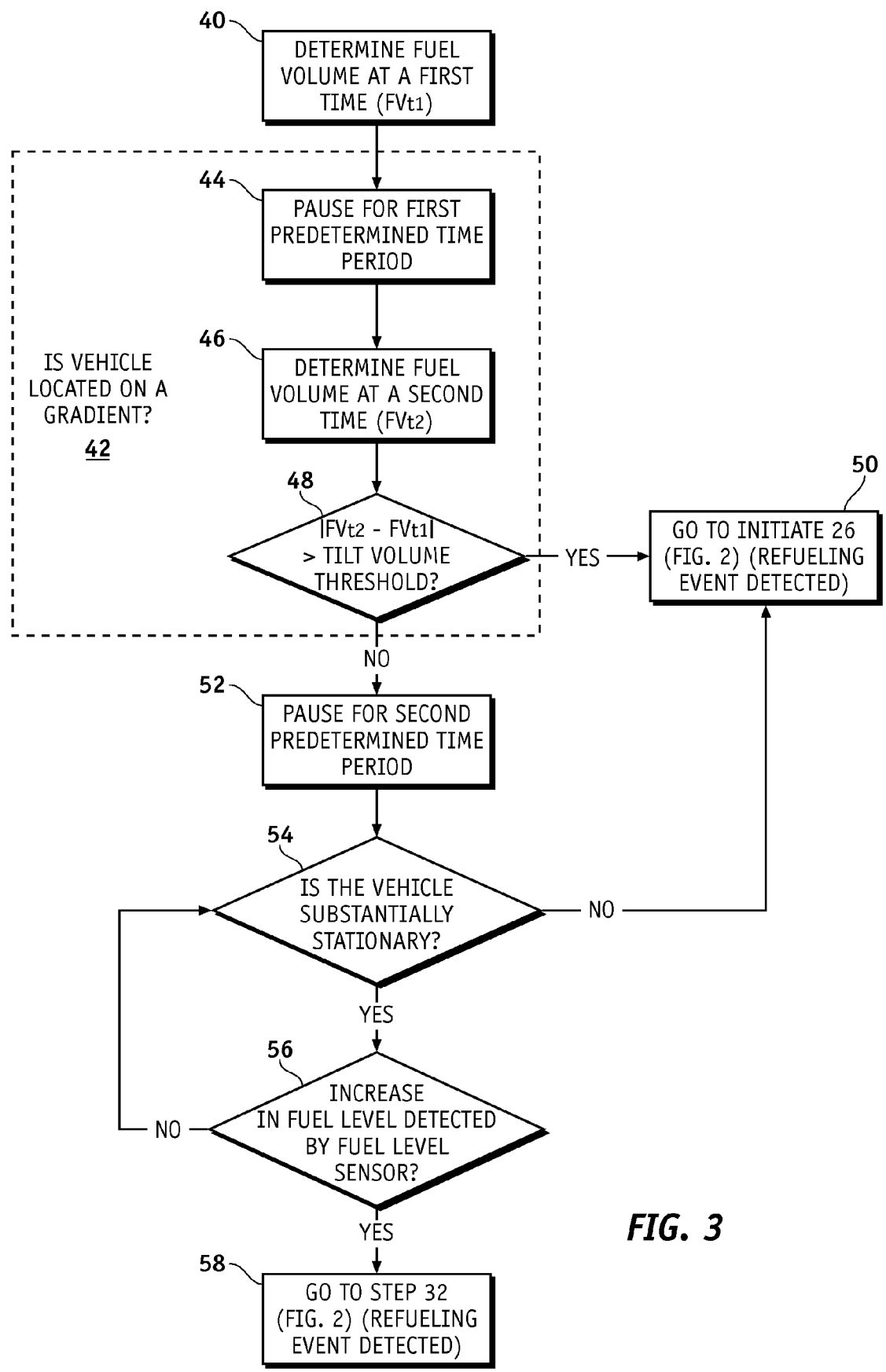
FIG. 3 is a flowchart illustrating an exemplary sub-process suitable for detecting a refueling event, which may be performed as a part of the exemplary fuel monitoring process shown in FIG. 2.

As noted above, processor 18 may search for a refueling event during STEP 28 (FIG. 2) in a number of manners. FIG. 3 illustrates an exemplary sub-process that may be performed by processor 18 during STEPS 28 and 30 of the process shown in FIG. 2 to search for a refueling event. Advantageously, the exemplary sub-process shown in FIG. 3 reduces the occurrence of false refuel detections due to fuel slosh and fuel displacement.

The sub-process illustrated in FIG. 3 commences with STEP 40 during which processor 18 establishes the volume of fuel 16 currently remaining within fuel storage tank 14 ($FV_{T1}$). Processor 18 establishes the volume of remaining fuel by calculating the remaining fuel volume as a function of fuel consumption and the base line fuel level in the manner described above. As generally indicated in FIG. 3 at 42, processor 18 next determines if the vehicle on an appreciable gradient and, therefore, if fuel storage tank 14 is tilted. As used herein the term "appreciable gradient" shall mean a gradient exceeding a minimal threshold value, which may vary in relation to tank geometry, float position, and other such factors. However, as a non-limiting example, the minimal threshold value may correspond to a 5% grade. Processor 18 may determine if the vehicle is on appreciable gradient by reference to an onboard orientation sensor (not shown), such as a gyroscope. However, to eliminate the need for such an orientation sensor, processor 18 preferably determines the orientation of fuel storage tank 14 by comparing any change in the amount of fuel 16 (as indicated by fuel level sensor 22) to a predetermined threshold, referred to herein as the "tilt volume threshold," as described below in conjunction with STEPS 44, 46, and 48.

During STEP 44, processor 18 pauses for a first predetermined time period before advancing to STEP 46. This first predetermined time period is preferably long enough to permit any fuel slosh to settle and may be, for example, approximately 10 to 30 seconds (e.g., 15 seconds). After pausing for the first predetermined time period, processor 18 again determines the volume of fuel 16 remaining within storage tank 14 ($FV_{T2}$). To this end, processor 18 measures the current fuel level via fuel level sensor 22 and converts this measurement to the current fuel volume. Next, at STEP 48, processor 18 compares the volume of fuel remaining after the first predetermined time period ($FV_{T2}$) to the volume of fuel remaining before the first time period ($FV_{T1}$). Specifically, processor 18 determines if the absolute value of the difference between $FV_{t1}$ and $FV_{T2}$ exceeds a predetermined tilt volume threshold (e.g., a value representing the minimum fuel displacement that occurs when the vehicle is located on an appreciable gradient). As a non-limiting example, the predetermine tilt volume threshold may be approximately 2 to 4 liters (e.g., 3 liters).

If, during STEP 48, processor 18 determines that the absolute value of the difference between $FV_{T2}$ and $FV_{T1}$ exceeds the tilt volume threshold, processor 18 concludes that the vehicle is located on a gradient and that a refueling event is not detected. As indicated in FIG. 3 at 50, processor 18 consequently advances to INTIATE 26 (FIG. 2) and the process shown in FIG. 2 repeats. If, however, the absolute value of the difference between $FV_{T2}$ and $FV_{T1}$ does not exceed the tilt volume threshold, processor 18 concludes that the vehicle is not located on a gradient and pauses for a second predetermined time period (STEP 52). The second predetermined time period is preferably equal in duration to the minimum amount of time required to refuel storage tank 14 and may be, for example, approximately 60 to 180 seconds (e.g., 120 seconds).

After the passage of the second predetermined time period, processor 18 advances to STEP 54 wherein processor 18 determines if the vehicle is substantially stationary. As noted above, processor 18 may determine if the vehicle is substantially stationary by monitoring vehicle speed or other such operational parameter. If it is determined that the vehicle is not substantially stationary, and therefore that the vehicle is moving, processor 18 concludes that a refueling event has not occurred and proceeds to INITIATE 26 of the process shown in FIG. 2 (indicated in FIG. 3 at 50). However, if it is instead determined that the vehicle is substantially stationary during STEP 52, processor 18 next determines whether there has been an increase in fuel (e.g., relative to the $FV_{T2}$) utilizing fuel level sensor 22 (STEP 56). If fuel level sensor 22 indicates that there has been an increase in fuel level, processor 18 concludes that a refueling event has occurred and advances to STEP 32 of the process shown in FIG. 2 (indicated in FIG. 3 at 58). If the fuel level has not increased, however, processor 18 returns to STEP 54 and again determines whether the vehicle is substantially stationary. In this manner, processor 18 continually monitors for an increase in fuel indicative of a refueling event while the vehicle is substantially stationary.

During STEP 56 of the above-described process, processor 18 concludes that a refueling event has occurred if fuel level sensor 22 detects any increase in fuel level. In an alternative embodiment, processor 18 may determine that a refueling event has occurred only when fuel level sensor 22 indicates that a minimum volume of fuel has been added to fuel storage tank 14. This minimum refueling volume threshold is preferably chosen to be small enough to account for refueling events wherein a relatively small volume of fuel is added to storage tank 14. At the same time, the refueling volume threshold is preferably chosen to be large enough to account for any disparities occurring between the output of fuel level sensor 22 and the fuel volume calculated utilizing fuel consumption data as a result of system inaccuracies. As a non-limiting example, the refueling volume threshold may be approximately equivalent to the tilt volume threshold (e.g., 2 to 4 liters).

It should thus be appreciated that there has been provided a system and a method for accurately monitoring the volume of fuel (or fuel level) within a vehicle's storage tank, which significantly decreases errors traditionally caused by fuel slosh and by fuel displacement. It should be noted that exemplary fuel monitoring system 10 may be configured to perform the fuel monitoring process (e.g., the exemplary process illustrated in FIGS. 2 and 3) across successive ignition cycles by storing data (e.g., a gradient flag, a refuel flag, etc.) in a non-volatile memory, which may be associated with processor 18. In such a case, processor 18 (FIG. 1) may be configured to complete an iteration of the fuel monitoring process even when the vehicle is shut-down in the midst of the iteration. Finally, it should be understood that, although the foregoing generally described the amount of fuel remaining in the vehicle storage tank in terms of volume, any characteristic indicative of the amount of remaining fuel may be utilized, including, for example, fuel level.

While at least one exemplary embodiment has been presented in the foregoing detailed description, it should be appreciated that a vast number of variations exist. It should also be understood that the embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A process for monitoring the amount of fuel remaining in the storage tank of a vehicle that includes a fuel injector and a fuel level sensor, the process comprising:
   searching for a refueling event;
   establishing a base line fuel level utilizing the fuel level sensor when a refueling event is detected;
   calculating fuel consumption as a function of the total time the fuel injector has been on since establishing the base line fuel level; and
   calculating the amount of fuel remaining in the storage tank as a function of fuel consumption and the base line fuel level.

2. A process according to claim 1 wherein the step of searching comprises monitoring for an increase in fuel while the vehicle is substantially stationary.

3. A process for monitoring the amount of fuel remaining in the storage tank of a vehicle that includes a fuel level sensor, the process comprising:
   determining if the vehicle is located on a gradient exceeding a minimum gradient threshold, the step of determining if the vehicle is located on a gradient comprising:
      establishing fuel volume at a first time (FVt1);
      calculating the fuel volume at a second subsequent time (FVt2) utilizing data provided by the fuel level sensor; and
      determining that the vehicle is located on a gradient if the absolute value of the difference between FVt2 and FVt1 exceeds a predetermined tilt volume threshold;
   establishing that a refueling event is not detected if the vehicle is located on a gradient;
   establishing a base line fuel level utilizing the fuel level sensor when a refueling event is detected;
   tracking fuel consumption; and
   calculating the amount of fuel remaining in the storage tank as a function of fuel consumption and the base line fuel level.

4. A process according to claim 3 wherein the vehicle includes an orientation sensor, and wherein the step of determining if the vehicle is located on a gradient comprises sensing the spatial orientation of the vehicle utilizing the orientation sensor.

5. A process according to claim 3 wherein the second time occurs between approximately 10 seconds and 30 seconds after the first time.

6. A process according to claim 3 wherein the tilt volume threshold is approximately 2 to 4 liters.

7. A process according to claim 3 wherein the vehicle includes a fuel injector, and wherein step of establishing fuel volume at a first time comprises calculating fuel volume at a first time as a function of the base line fuel level and the total time the fuel injector has been on since establishing the base line fuel level.

8. A process according to claim 3 wherein the step of searching comprises:
monitoring for an increase in fuel utilizing the fuel level sensor; and
concluding that a refueling event has occurred if there is an increase in fuel.

9. A process according to claim 8 wherein the step of monitoring is continually performed while the vehicle is substantially stationary.

10. A process according to claim 8 wherein the step of monitoring for an increase in fuel occurs approximately 60 to 180 seconds after the second subsequent time.

11. A process according to claim 3 wherein the step of searching comprises:
monitoring for an increase in fuel utilizing the fuel level sensor; and
concluding that a refueling event has occurred when the increase in fuel exceeds a minimum volume threshold.

12. A process according to claim 11 wherein the minimum volume threshold is approximately 2 to 4 liters.

13. A process for monitoring the amount of fuel remaining in a vehicle's storage tank, the vehicle including a fuel level sensor, the process comprising:
determining if the vehicle is located on a gradient exceeding a minimal threshold;
searching for a refueling event when the vehicle is not located on a gradient;
establishing a base line fuel level utilizing data provided by the fuel level sensor when a refueling event is detected;
tracking the amount of fuel consumed; and
calculating the amount of fuel remaining in the storage tank as a function of the base line fuel level and the fuel consumed since last-establishing the base line fuel level.

14. A process according to claim 13 wherein the step of searching comprises monitoring for an increase in fuel while the vehicle is substantially stationary.

15. A process according to claim 13 wherein the step of determining comprises:
establishing fuel volume at a first time (FVt1) as a function of the base line fuel level and the fuel consumed since last-establishing the base line fuel level;
measuring the fuel level at a second time utilizing the fuel level sensor, the second time occurring after the first time;
converting the fuel level measured at the second time to a fuel volume (FVt2); and
determining that the vehicle is located on a gradient if the absolute value of the difference between FVt2 and FVt1 exceeds a predetermined tilt volume threshold.

16. A process according to claim 15 wherein the step of searching comprises:
monitoring for an increase in fuel utilizing the fuel level sensor; and
concluding that a refueling event has occurred if there is an increase in fuel.

17. A fuel monitoring system for use in conjunction with including a storage tank, the fuel monitoring system comprising:
a fuel injector;
a fuel level sensor configured to measure the fuel level of the fuel held within the storage tank; and
a processor coupled to the fuel level sensor and to the fuel injector, the processor configured to:
search for a refueling event;
establish a base line fuel level utilizing the fuel level sensor when a refueling event is detected;
track fuel consumption by calculating fuel consumption as a function of the base line fuel level and the total time the fuel injector has been on since last establishing the base line fuel level; and
calculate the amount of fuel remaining within the storage tank as a function of fuel consumption and the base line fuel level.

* * * * *